(12) United States Patent
Jenichen

(10) Patent No.: US 10,886,076 B2
(45) Date of Patent: Jan. 5, 2021

(54) DEVICE AND METHOD FOR SWITCHING MEDIUM AND/OR HIGH VOLTAGES WITH A SPECIFIC DRIVE CHARACTERISTIC

(71) Applicant: SIEMENS AKTIENGESELLSCHAFT, Munich (DE)

(72) Inventor: Henry Jenichen, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/327,003

(22) PCT Filed: Jul. 25, 2017

(86) PCT No.: PCT/EP2017/068725
§ 371 (c)(1),
(2) Date: Feb. 21, 2019

(87) PCT Pub. No.: WO2018/036737
PCT Pub. Date: Mar. 1, 2018

(65) Prior Publication Data
US 2019/0189367 A1     Jun. 20, 2019

(30) Foreign Application Priority Data

Aug. 22, 2016 (DE) .......................... 10 2016 215 699

(51) Int. Cl.
*H01H 3/60* (2006.01)
*H01H 33/40* (2006.01)
(Continued)

(52) U.S. Cl.
CPC ............... *H01H 3/605* (2013.01); *F03G 1/10* (2013.01); *F16F 9/53* (2013.01); *F16F 13/007* (2013.01);
(Continued)

(58) Field of Classification Search
CPC . H01H 3/605; H01H 3/42; H01H 3/46; F03G 1/10; F16F 9/53
(Continued)

(56) References Cited

U.S. PATENT DOCUMENTS

2005/0016962 A1*  1/2005  Loebner .................... F16F 9/54
                                                                218/84
2008/0053801 A1   3/2008  Korber
(Continued)

FOREIGN PATENT DOCUMENTS

CN           1395660 A      2/2003
CN         101188168 A      5/2008
(Continued)

*Primary Examiner* — Nguyen Tran
*Assistant Examiner* — Iman Malakooti
(74) *Attorney, Agent, or Firm* — Laurence Greenberg; Werner Stemer; Ralph Locher

(57) ABSTRACT

A device for switching medium and/or high voltages has a spring-loaded drive for driving a kinematic chain. At least one energy storage spring and at least one damping element for generating a drive movement with specific drive characteristics are included. The at least one damping element is an active damping element. The damping is actively determined during switching or it is predetermined, in particular depending on environmental variables and/or the type of switching situation, by changing the settings of the at least one damping element.

20 Claims, 1 Drawing Sheet

(51) Int. Cl.
*F16F 13/00* (2006.01)
*F16F 9/53* (2006.01)
*F03G 1/10* (2006.01)
*H01H 3/30* (2006.01)
*H01H 3/42* (2006.01)
*H01H 3/46* (2006.01)

(52) U.S. Cl.
CPC .............. *H01H 3/30* (2013.01); *H01H 33/40* (2013.01); *H01H 3/42* (2013.01); *H01H 3/46* (2013.01)

(58) Field of Classification Search
USPC ....................................................... 200/48 R
See application file for complete search history.

(56) References Cited

U.S. PATENT DOCUMENTS

| | | | |
|---|---|---|---|
| 2008/0197008 A1* | 8/2008 | Einschenk | H01H 33/6661 200/48 R |
| 2009/0020508 A1 | 1/2009 | Lohrberg et al. | |
| 2009/0166168 A1* | 7/2009 | Nakauchi | H01H 31/003 200/48 R |

FOREIGN PATENT DOCUMENTS

| | | | | |
|---|---|---|---|---|
| CN | 101226845 A | 7/2008 | | |
| DE | 69931743 T2 | 5/2007 | | |
| DE | 102011081921 A1 | 2/2013 | | |
| EP | 0468272 | * | 1/1992 | ............ H01H 71/50 |
| EP | 0468272 A2 | 1/1992 | | |
| WO | 0244585 A1 | 6/2002 | | |

\* cited by examiner

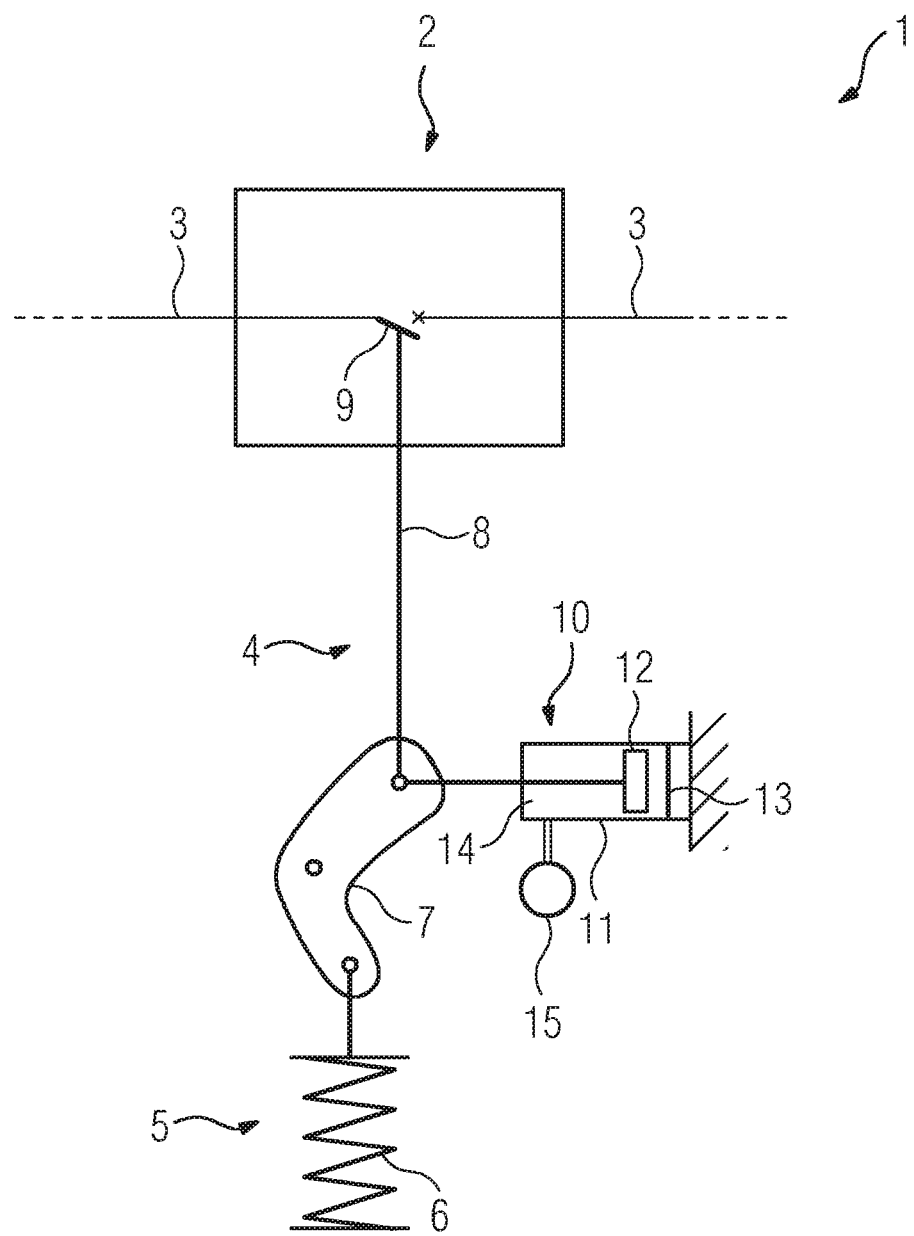

DEVICE AND METHOD FOR SWITCHING MEDIUM AND/OR HIGH VOLTAGES WITH A SPECIFIC DRIVE CHARACTERISTIC

BACKGROUND OF THE INVENTION

Field of the Invention

The invention relates to a device and a method for switching medium and/or high voltages, comprising or using a spring energy store drive for generating a drive movement and for driving a kinematic chain. At least one energy storage spring and at least one damping element are included for generating a drive movement with a specific drive characteristic.

Switching devices for medium and high voltages, in particular circuit breakers, comprise electrical contacts comprising contact pieces. Movable contact pieces are moved via elements in a kinematic chain during switching, whereby the contacts are opened or closed. A drive provides the kinetic energy which is required for the switching operation. Medium and high voltages, in particular voltages in the range of from 1 kV to 70 kV and/or from 70 kV to 1200 kV, can be switched, by opening or disconnecting at least one current path. As a result, electrical generators and/or electrical consumers and/or parts of power supply systems can be disconnected from one another or connected to one another. This is particularly necessary in the event of the occurrence of fault currents on power supply systems.

Spring energy store drives can be used as the drive, wherein at least one energy storage spring stores the energy for switching. Crank handles and/or motors can be used in order to supply the energy to the energy storage spring, which stores this energy until the switching time. For single-pole and multi-pole switches, at least one switch-on spring and at least one switch-off spring can be provided, wherein multi-pole switches can have at least one drive per pole or a common drive for a plurality of poles. The contacts can alternatively or additionally also be driven directly by a linear motor, for example.

Elements in a kinematic chain transmit the kinetic energy from the drive to the movable contact pieces of the electrical contacts during switching. Gear elements, such as, for example, shafts and levers, can be included in order to change the movement direction and force which are transmitted to the movable contact pieces, for example via a switching rod. For quick switching, in particular in the milliseconds range, high forces and rapid movements are required. Unchecked, these can result in damage to contact pieces and to elements in the kinematic chain. An unchecked collision of contact pieces, for example at the end of a switch-on movement, can result in deformation or even irreversible destruction of the contact pieces.

With the aid of damping elements, the kinetic energy can be absorbed, for example at the end of a movement, and the movement can be slowed down in order to avoid, for example, damage to or destruction of contact pieces. The damping elements can act on different points in the kinematic chain, for example on gear elements and/or the drivetrain. By virtue of the configuration of, for example, the drive, contact pieces and/or elements in the kinematic chain, in particular gear elements, and by virtue of the use of damping elements, a time-dependent profile of the drive movement is determined. A quick movement at the start of the switching operation and a braked, slowed-down movement at the end of the switching operation can thus be generated.

The configuration of, for example, the drive, of contact pieces and/or of elements in the kinematic chain, in particular of gear elements, and of damping elements determines the time-dependent profile of the drive movement. The selection and arrangement of the elements produces a predetermined drive movement which takes place reproducibly during each identical switching operation, i.e. takes place in the same way during each switch-on or switch-off operation. Control or regulation of the drive movement depending on, for example, a switching case, for example in the event of a short-circuit current or in the event of targeted connection or disconnection of electrical generators or consumers, is not possible with the described design. The design of the switching device determines the time-dependent profile of the switching movement, and the switching movement is not variable after completion of the switching device without changing the design, i.e. without external structural interventions.

SUMMARY OF THE INVENTION

The object of the present invention consists in specifying a device for switching medium and/or high voltages which makes it possible to change the time-dependent profile of the switching movement at any point in time. In particular, the object of the present invention consists in specifying a device which enables adjustment of a specific time-dependent profile of the switching movement, in particular by regulation or control, between switching operations, i.e. in predetermined fashion, and/or during switching operations.

The specified object is achieved according to the invention by a device for switching medium and/or high voltages having the features as claimed and/or by a method for generating a drive movement with a specific drive characteristic, in particular using a previously described device, as claimed. Advantageous configurations of the device according to the invention for switching medium and/or high voltages and/or of the method for generating a drive movement with a specific drive characteristic are specified in the dependent claims. In this case, subjects of the main claims can be combined with one another and with features of dependent claims and features of the dependent claims can be combined with one another.

A device according to the invention for switching medium and/or high voltages, comprising a spring energy store drive for driving a kinematic chain, comprises at least one energy storage spring and at least one damping element for generating a drive movement with a specific drive characteristic. The at least one damping element is an active damping element.

An active damping element in a device for switching medium and/or high voltages whose damping is variable, i.e. is adjustable by regulation or control over time, makes it possible to change the time-dependent profile of the switching movement at any point in time. As a result, an adjustment of a specific time-dependent profile of the switching movement is made possible, in particular by regulation or control, between or prior to switching operations, i.e. in predetermined fashion, and/or during switching operations.

The at least one active damping element can comprise a hydraulic damper. Hydraulic dampers are cost-effective, enable damping in a broad range of damping constants, can be arranged easily spatially and have a long life. In particular, oil dampers or gas dampers can be used. An adjustment of the damping constant or damping can take place by virtue of changing the pressure in the damper, for example by changing the oil or gas volume, or by pumping or draining oil or gas into a compensating volume, for example.

At least one control unit can be included and/or the at least one active damping element can be regulated or controlled via a control unit. The control unit can change, in controlled fashion, the damping constant of the damping element in temporally dependent fashion, for example in order to generate a specific movement profile during switching, for example by pumping fluid such as oil or gas into the damper volume or by draining fluid via a drain cock which can be regulated, or by changing the damper volume by physically displacing a volume boundary such as, for example, a cylinder base.

Sensors and/or pickups can be included, which are designed to determine input variables for the control unit, for regulating or controlling the damping of the at least one active damping element. As a result, damping and a specific drive characteristic during switching can be produced which can be adjusted depending on, for example, environmental factors such as temperature and/or air pressure.

A high-voltage switching device, in particular a medium-voltage and/or high-voltage circuit breaker, can be included, in particular for a voltage range of from 1 kV to 70 kV and/or from 70 kV to 1200 kV. High-voltage circuit breakers are very suitable for switching medium to high powers. In this case, for example, vacuum interrupters or insulating-gas-based circuit breakers, such as, for example, circuit breakers filled with $SF_6$, can be included under the term high-voltage switching device. The at least one active damping element can be arranged in the spring energy store drive, in particular in a common housing with the energy storage spring or drive spring. This enables a compact shape of the device for switching medium and/or high voltages. An active damping element can also alternatively or additionally be arranged in different positions in the kinematic chain, for example on gear elements and/or the drivetrain. The arrangement of active damping elements can be performed depending on physical and kinematic requirements.

The spring energy store drive can comprise at least one energy storage spring for a switch-on movement and/or comprise at least one energy storage spring for a switch-off movement.

In this case, each energy storage spring of the spring energy store drive can have in each case at least one active damping element. As a result, independent, targeted damping of, for example, a switch-on and switch-off movement is possible.

The energy storage springs of the spring energy store drive can alternatively have a common active damping element. As a result, savings can be made in respect of costs and installation space, and the active adjustment of the damping of the damping element makes it possible to specifically change the damping during a switch-on movement and a switch-off movement. For the switch-on movement and the switch-off movement, the optimum damping can be adjusted in predetermined fashion or during the switching process. As a result, for example, even in the case of the use of only one spring for a switch-on and switch-off movement, a different movement characteristic can be generated for the switch-on and switch-off operation.

The device can comprise an electrically insulating fluid, in particular a liquid and/or a gas, in particular $SF_6$. The device, in particular with the at least one high-voltage switching device, can be filled with the electrically insulating fluid, in particular a liquid and/or a gas, in particular $SF_6$, or the high-voltage switching device can be filled therewith.

A method according to the invention for generating a drive movement with a specific drive characteristic, in particular using an above-described device, comprises that the drive movement is generated in a spring energy store drive and is transmitted via elements in a kinematic chain. At least one energy storage spring and at least one damping element effect the specific drive characteristic. The damping takes place actively by virtue of the at least one damping element, in particular depending on environmental variables and/or the nature of the switching case.

The damping of the at least one damping element can be adjusted depending on temperature, pressure, nature of the switching case, in particular profile of a short circuit.

Thus, for example, changes in the spring constant in the event of temperature changes can be compensated for by actively changing the damping in order to generate identical drive movements during switching in the case of altered environmental influences. For different switching cases, for example in the event of a short circuit or in the event of a previously planned disconnection of power supply system elements such as, for example, consumers, transmission lines and/or electrical generators, for example for maintenance, different time-dependent profiles of the disconnection can be realized. Thus, for example, a switching operation in the event of a short circuit can take place very quickly, in particular in the milliseconds range, and in the event of a planned disconnection, it can take place more slowly in order to protect, for example, contact pieces from high levels of wear and/or to generate a targeted, slower voltage drop on the power supply system.

A time-dependent profile of the switching and/or the drive movement can be regulated or controlled by changing the damping of the at least one damping element during the switching and/or during the drive movement, in particular by means of a control unit. The drive movement can thus take place in optimized fashion, for example differently for switch-on and switch-off operations. The drive movement with a specific characteristic can enable desired time-dependent voltage drop profiles on the connected lines and/or can take place in optimized fashion during the switching operation for different switching phases such as, for example, opening/closing of an arcing contact or opening/closing of a rated current contact. Savings can be made in respect of components, for example in a gear, since control of the time-dependent profile of the switching movement takes place via the active damping element instead of via gear elements.

A drive movement with a predetermined drive characteristic can be generated by adjusting the damping of the at least one damping element, in particular by regulation or control, in particular depending on input variables, determined by sensors and/or pickups, with the aid of a control unit, in particular depending on temperature, pressure, voltage and/or current.

Adaptation of the drive characteristic can take place in real time, by adjustment of the damping of the at least one damping element.

The advantages of the method according to the invention for generating a drive movement with a specific drive characteristic, in particular using an above-described device, as claimed in the method claims, are similar to the above-described advantages of the device for switching medium and/or high voltages as claimed in the device claims, and vice versa.

Exemplary embodiments of the invention are illustrated schematically in the single FIGURE below and will be described in more detail in the text which follows.

BRIEF DESCRIPTION OF THE VIEWS OF THE DRAWING

The FIGURE shows schematically a device 1 according to the invention for switching medium and/or high voltages, comprising an active damping element 10.

DESCRIPTION OF THE INVENTION

The FIGURE shows schematically a device according to the invention for switching medium and/or high voltages, comprising a hydraulic damper as active damping element 10. The device 1 comprises a circuit breaker 2 having electrical connections 3. In particular, electrical lines for a power supply system, electrical consumers and/or electrical generators can be connected to the connections. The circuit breaker 2 comprises an electrical contact 9, which is designed to disconnect or connect an electrical current path. The elements of the electrical contact 9, such as, for example, rated current contact pieces and/or arcing contact pieces, are not illustrated in the FIGURE for reasons of simplicity.

For switching of the circuit breaker 9, at least one movable contact piece or a plurality of movable contact pieces are moved from or into a closed or open position of the current path. The kinetic energy for the movement of the contact pieces is stored in an energy storage spring 6 of a spring energy store drive 5, and during switching, the stored kinetic energy is released, for example by virtue of latching of the energy storage spring 6 being released. The kinetic energy is transmitted from the spring energy store drive 5 to the movable contact pieces of the contact 9 via a kinematic chain 4. The contact 9 of the circuit breaker 2 is opened or closed, and the current path is disconnected or electrically conductively connected via the circuit breaker 2.

For transmission of the kinetic energy, the kinematic chain 4 comprises in particular elements such as, for example, a drivetrain 8, which is connected to at least one movable contact piece, and/or gear elements 7, such as, for example, levers and shafts for transmitting the forces from the drive spring 6 to the drivetrain 8. Damping elements 10 can be provided for damping the movement, in particular at the end of a switching operation, for example on the energy storage springs 6 and/or on gear elements 7, and/or on the drivetrain 8 and/or directly on movable contact pieces. The FIGURE shows, by way of example, a damping element 10 on a gear element 7, in the form of a lever.

The movement characteristics of the movable contact pieces, i.e. the change, over time, in the movement and/or the transmitted forces for the movement of the contact pieces, and associated therewith the time-dependent profile of the switching operation, are determined in particular by the properties of the energy storage spring 6 and by elements in the kinematic chain 4, for example the gear elements 7, and properties of the contact 9. The design of the device 1, in particular the selection and arrangement of the elements 6, 7, 8, 9, determines the movement characteristic during switching. With a specific design, a specific movement characteristic is generated which is the same in the case of each switching operation without an active damping element 10, apart from environmental influences and a degradation over time of elements of the device 1.

By virtue of at least one active damping element 10, such as is illustrated schematically, by way of example, in the FIGURE as a hydraulic damper, the movement characteristic can be changed at any time. A change can take place in predetermined fashion, i.e. prior to switching operations. The change can also take place during the switching operation and can change the time-dependent profile of the movement during the switching operation. In order to change the movement characteristic, the damping constant, i.e. the damping of the damping element 10, is changed. In the exemplary embodiment illustrated in the FIGURE, the damping element 10, as hydraulic damper, comprises a housing 11, for example a cylindrical housing, in which a piston 12, for example a cylindrical piston, is arranged movably. The piston 12 is connected to elements in the kinematic chain 4, for example via a rod to the lever 7 as gear element.

The housing 11 of the damping element 10 is filled with a fluid, for example with oil or gas. The movement of the piston 12 in the fluid takes place in braked fashion, in particular depending on the viscosity of the fluid and/or geometric variables such as, for example, the distance between the piston 12 and the wall of the housing 11. By changing the pressure in the housing 11, the viscosity of the fluid and therefore the damping of the damping element 10 can be changed. For example, a pump 15 can change, by regulation or control, the pressure in the housing 11, and thereby set a specific viscosity and damping. Alternatively or additionally, pressure compensation vessels can be used in conjunction with valves for adjusting a desired pressure. A change in the pressure in the fluid can also take place, as illustrated in the FIGURE, by means of displacement of a wall 13, and therefore a change in the volume 14, filled with fluid, of the housing 11.

A change in the damping of the damping element 13 effects, by virtue of the change in the movement of the gear element 7 in the exemplary embodiment in the FIGURE, a change in the switching movement transmitted via the kinematic chain 4. Damping can be set to be constant for the entire switching time prior to the switching operation or can be changed during the switching, for example can be increased at the end of the switching operation in order to achieve braking of the movable contact pieces at the end of the switching. As a result, a drive movement with a specific drive characteristic or movement characteristic is possible, predetermined prior to the switching or changeable during the switching.

The above-described exemplary embodiments can be combined with one another and/or can be combined with the prior art. Thus, for example, different types of damping elements 10 can be used. For example, active hydraulic damping elements 10, active spring damping elements, in particular with a spring suspension which can be displaced by regulation or control, electromagnetic damping elements as active damping elements, or other types of active damping elements, in particular for mechanical energy, can be used. A different number of active damping elements can be used, in particular also combined with passive damping elements. Regulation or control of the damping, in particular with a damping constant dependent on time, can take place via at least one control device, in particular using a computer. Data from measuring instruments and/or sensors and pickups can be used for the regulation or control, wherein damping or a movement characteristic is adjusted depending on, for example, environmental parameters or types of switching cases.

The active damping element(s) 10 can be arranged at different positions in the device. It is also possible for different types of active damping elements 10 to be arranged at different positions in the device and/or at the same position. Damping by means of the active damping elements 10 can take place in particular depending on the energy storage spring(s) 5. Thus, for example, movement characteristics, generated by an energy storage spring 5, can be compensated for by the active damping elements 10. In particular in the case of multiple switching with an energy storage spring 5, without tensioning of the spring 5 in the meantime, whereby the spring force decreases, for example, compensation is possible, for example, by a reduction in the damping with each switching operation, by means of the active damping element 10. Different movement characteristics can be generated in particular using an energy storage spring 5 for switch-on and switch-off operations. When using different energy storage springs 5 for switching on and switching off, an active damping element 10 can be used for both springs 5, or each energy storage spring 5 can be provided with at least one active damping element 10.

LIST OF REFERENCE SYMBOLS 1 device for switching medium and/or high voltages
2 circuit breaker
3 electrical connections
4 kinematic chain
5 spring energy store drive
6 energy storage spring
7 gear elements, for example levers and shafts
8 drivetrain
9 electrical contact
10 active damping element
11 housing
12 piston
13 displaceable wall
14 fluid volume, for example oil or gas volume
15 pump

The invention claimed is:

1. A device for switching medium and/or high voltages, the device comprising:
    a spring energy storage drive for driving a kinematic chain, said spring energy storage drive having at least one energy storage spring, and at least one damping element being an active damping element;
    said at least one energy storage spring and said at least one damping element being configured to generate a drive movement of the kinematic chain with a specific drive characteristic.

2. The device according to claim 1, wherein said at least one active damping element comprises a hydraulic damper.

3. The device according to claim 1, further comprising at least one control unit and/or wherein said at least one active damping element is controlled or closed-loop controlled via a control unit.

4. The device according to claim 3, which comprises sensors and/or pickups configured to acquire input variables for said control unit, for controlling of closed-loop controlling a damping behavior of said at least one active damping element.

5. The device according to claim 1, configured as a high-voltage switching device.

6. The device according to claim 5, wherein the high-voltage switching device is a medium-voltage circuit breaker for switching voltages in a range from 1 kV to 70 kV and/or a high-voltage circuit breaker for switching voltages in a range from 70 kV to 1200 kV.

7. The device according to claim 1, wherein said at least one active damping element is disposed in said spring energy storage drive.

8. The device according to claim 7, wherein said at least one active damping element is disposed in a common housing with said spring energy storage drive.

9. The device according to claim 1, wherein said spring energy storage drive comprises at least one energy storage spring for a switch-on movement and/or at least one energy storage spring for a switch-off movement.

10. The device according to claim 9, wherein each said energy storage spring of said spring energy store drive has in each case at least one active damping element.

11. The device according to claim 9, wherein said at least one energy storage spring of said spring energy store drive is one of a plurality of energy storage springs, and said energy storage springs have a common active damping element.

12. The device according to claim 1, further comprising an electrically insulating fluid and/or wherein the device is a high-voltage switching device filled with the electrically insulating fluid.

13. The device according to claim 12, wherein said electrically insulating fluid is a liquid or a gas.

14. The device according to claim 13, wherein the fluid is SF6.

15. A method for generating a drive movement with a specific drive characteristic, the method comprising:
    generating the drive movement in a spring energy storage drive and transmitting the drive movement via elements in a kinematic chain;
    effecting the specific drive characteristic with at least one energy storage spring and at least one damping element being an active damping element; and
    thereby actively damping with the at least one damping element in dependence on specific environmental variables and/or a nature of a specific switching operation.

16. The method according to claim 15, which comprises adjusting the damping of the at least one damping element in dependence on a variable selected from the group consisting of a temperature, a pressure, and profile of a short circuit.

17. The method according to claim 15, which comprises controlling a time-dependent profile of the switching and/or the drive movement by changing a damping of the at least one damping element during the switching and/or during the drive movement.

18. The method according to claim 15, which comprises generating the drive movement with a predetermined drive characteristic by adjusting the damping of the at least one damping element with a control unit in dependence on input variables determined by sensors and/or pickups.

19. The method according to claim 15, which comprises adapting the drive characteristic in real time, by adjusting of the damping of the at least one damping element.

20. A method for generating a drive movement with a specific drive characteristic, the method comprising:
    generating the drive movement in a spring energy storage drive and transmitting the drive movement via elements in a kinematic chain;
    effecting the specific drive characteristic with at least one energy storage spring and at least one damping element being an active damping element; and
    thereby actively damping with the at least one damping element in dependence on specific environmental variables and/or a nature of a specific switching operation;
    providing a device according to claim 1 and generating the drive movement with the specific drive characteristic using the device according to claim 1.

\* \* \* \* \*